Aug. 11, 1964 G. POULOS 3,144,133
DISPLAY APPARATUS
Filed June 20, 1961 2 Sheets-Sheet 1

INVENTOR.
George Poulos
BY Ooms McDougall
and Hersh
Att'ys

Aug. 11, 1964

G. POULOS 3,144,133

DISPLAY APPARATUS

Filed June 20, 1961

INVENTOR.
George Poulos
BY Ooms, McDougall
and Hersh
Attys

United States Patent Office 3,144,133
Patented Aug. 11, 1964

3,144,133
DISPLAY APPARATUS
George Poulos, 3020 Pearl St., Franklin Park, Ill.
Filed June 20, 1961, Ser. No. 118,312
17 Claims. (Cl. 211—1.5)

The present invention relates to an apparatus designed for the provision of various advertising displays and the like in markets, department stores, drug stores and similar establishments. The invention particularly relates to a display apparatus of the type wherein articles to be displayed are presented in an effective, recognizable, eye-catching and pleasing manner.

Various mechanisms have been proposed for the arrangement of advertising displays and the like in various stores. Among these proposals there has been suggested the use of spring poles which are adapted to stand vertically in an establishment and upon which various hangers and the like can be provided for holding displays. The spring poles are ordinarily provided with compressible or adjustable ends which enable adaptation to areas of various heights in the establishments. The poles conventionally employed are considered unsatisfactory for the reason that the displays thereon are substantially immovable and there are limited available visible arrangements possible with the stationary poles.

It is therefore an object of this invention to provide a display apparatus which is adapted to present advertising displays in effective, recognizable, eye-catching and pleasing arrangements.

It is a further object of this invention to provide a display apparatus which improves over stationary type display poles in that the improved apparatus presents mobile features and provides for increased available visible arrangements.

It is an additional object of this invention to provide a display apparatus which generally comprises pole sections with an intermediate movable arrangement adapted to rotate displays positioned thereon.

These and other objects of this invention will appear hereinafter and for purposes of illustration, but not of limitation, specific embodiments of this invention are shown in the accompanying drawings in which—

The display apparatus of this invention is generally characterized by a pair of axially aligned pole sections and means for holding the pole sections in spaced apart relationship. In the open area provided between the pole sections a display holding element is rotatably mounted and a motor means is provided for driving the display holding element.

Figure 1:
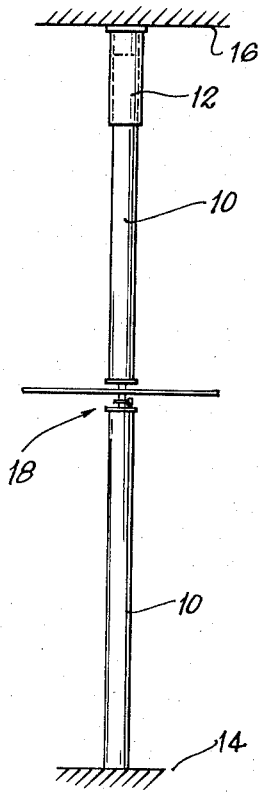
FIGURE 1 is a diagrammatic elevational view of a display assembly characterized by the principles of this invention.

In considering the accompanying drawings, there is shown in FIGURE 1 a pair of pole sections 10, the upper one of which has a tubular sleeve 12. The sleeve is preferably provided with a compression spring or the like for adjustability whereby the pole sections may be adapted for various positions within an establishment. As shown in FIGURE 1 the pole sections are disposed between a floor, ledge or counter 14 and the ceiling 16.

Figure 2:
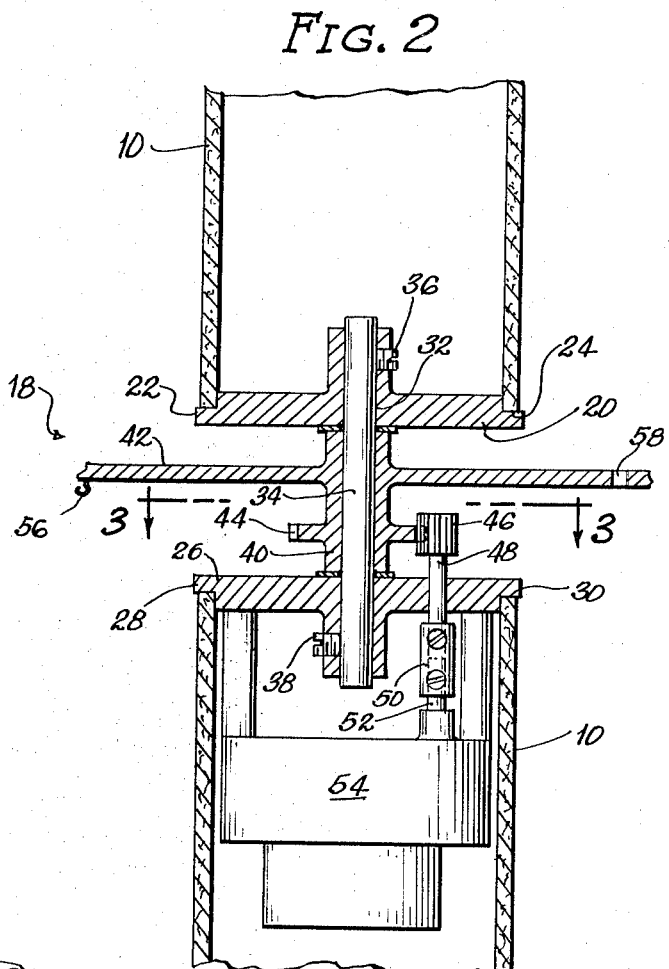
FIGURE 2 is a cross-sectional view illustrating the mechanical elements which lend to the display assembly the movable characteristics.

FIGURE 2 illustrates a turntable assembly 18 which comprises the movable display holding elements of this invention. The assembly 18 includes an upper holding plate 20 having a flanged periphery 22 which is adapted to receive the bottom edge 24 of the upper pole section 10. A lower holding plate 26 having a flanged periphery 28 is adapted to receive the upper edge 30 of the lower pole section 10.

The holding plates 20 and 26 are provided with a centrally located bore 32 through which a shaft 34 is adapted to pass. Set screws 36 and 38 hold the plates in a predetermined spaced apart relationship with respect to the shaft 34. In the open area between the plates 20 and 26 a hub 40 is rotatably fitted about the shaft 34. The hub is provided with a platform 42 and a gear 44.

A pinion 46 is securely mounted on a shaft 48 which extends through the plate 26 and is fastened at 50 to the drive shaft 52 of the motor 54.

In the operation of the described display assembly various articles to be displayed may be provided on the platform 42. These articles may be set on the shelf of the platform or the articles may be hung by means of a plurality of hooks 56 or holes 58. Furthermore, in place of a platform of the type described a plurality of wire hangers or similar devices may be provided to radiate outwardly from the rotatable hub. It will be apparent that when the desired displays are placed in position and the motor made operative there will be a continuous presentation of the displays around the entire area of the pole. This will provide an eye-catching arrangement due to the movement of the various displays, and it will also permit the use of an increased number of displays, for example, where the pole is placed adjacent a wall or corner of an establishment. The displays are fixed in the air, out of the way of normal traffic, and the use of the adjustable poles permits suspension between virtually any two surfaces in an establishment. The turntable assembly 18 is provided as an essentially unitary mechanism which can be removed and interfitted with respect to pole sections of different sizes.

Figure 4:
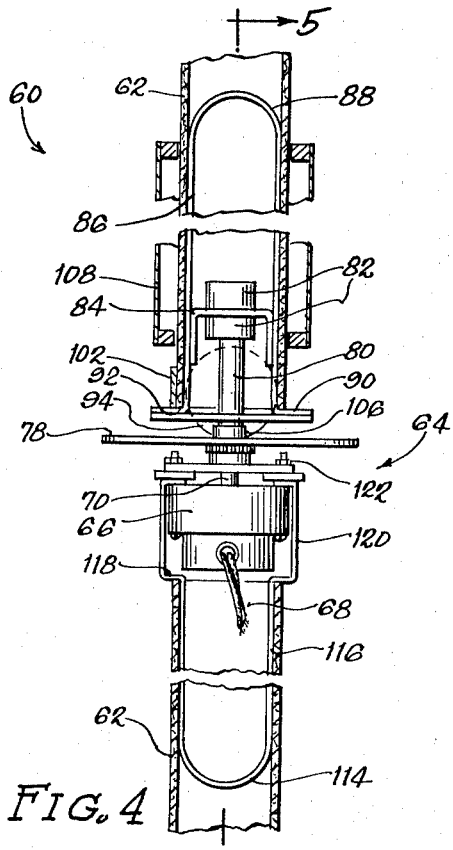
FIGURE 4 is a cross-sectional view illustrating an alternative embodiment of the display apparatus of this invention.
Figure 5:
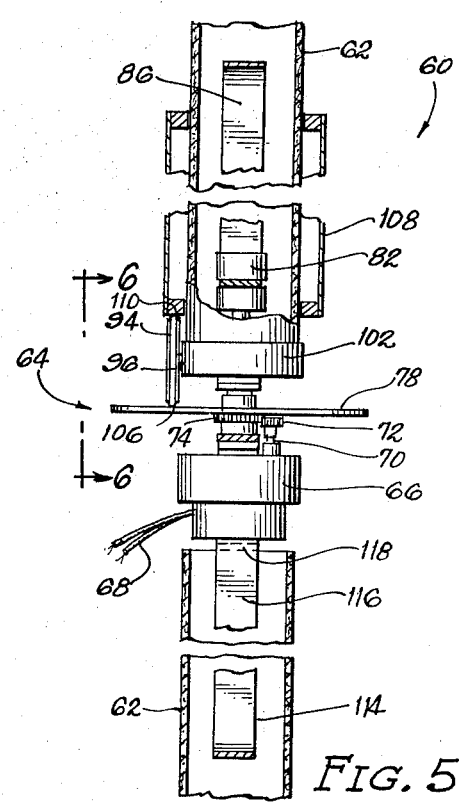
FIGURE 5 is a cross-sectional view taken about the line 5—5 of FIGURE 4.
Figure 6:
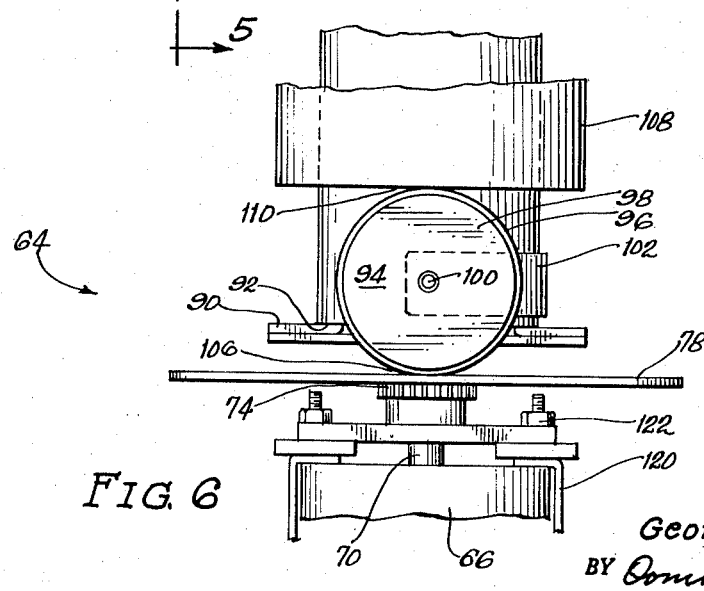
FIGURE 6 is a detail cross-sectional view taken about the line 6—6 of FIGURE 5.

FIGURES 4 through 6 illustrate an alternative arrangement of a display apparatus. The display apparatus 60 comprises a pair of axially aligned pole sections 62 and a turntable assembly generally designated by the numeral 64. The assembly, which is similar in operation to the assembly 18, includes an electric motor 66 having power wires 68. The drive shaft 70 of the motor is connected to a pinion 72 which is in meshing engagement with the gear 74. The gear 74 is fixedly secured to the platform 78 whereby the platform may be rotated in response to operation of the motor.

The platform 78 has connected thereto a shaft 80, the shaft having disposed at its other end a pair of sleeves 82 fixed as by set screws to the shaft 80. The sleeves 82 are positioned on either side of a bracket 84 and the bracket is fixed to the arms 86 of a U-shaped member 88. The shaft 80 is thus adapted to be accurately positioned with respect to the member 88.

The arms 86 of the U-shaped member terminate in outwardly turned ends 90 which are adapted to abut the lower edge 92 of the upper pole section whereby the member 88 will be accurately positioned with respect to this pole section. The arms on the member 88 are demensioned to fit snugly within the pole section whereby the arms and pole section will be held in resilient engagement but may be readily removed by pulling them apart.

A friction wheel 94 comprising a non-slip portion 96 composed of rubber or the like and a rim 98, is rotatably mounted at 100 on a clamp 102. The arms of the clamp 102 are adapted to be forced around the body of the pole section and thus resiliently hold the clamp with respect to the pole section.

The wheel 94 is positioned to engage the platform 78 at 106 and is also positioned to engage the display 108 110. The display 108 is loosely fitted about the pole section and is, therefore, adapted to rotate in response to movement of the wheel 94.

The assembly is fixed with respect to the lower pole section 62 by means of a U-shaped member 114 having arms 116 spaced apart to snugly fit within the pole section in the same manner as the U-shaped member 88. The outwardly turned shoulders 118 of the member 114 are adapted for accurate positioning of the motor with respect to the lower section. Extensions 120 of the member 114 are adapted to receive fasteners 122 which enable securement of the motor 66 with respect to the member 114.

In the operation of the device shown in FIGURES 4 through 6 the motor 66 is made operative and the platform 78 will rotate in response thereto. Engagement of the friction wheel 94 with the platform will cause rotation in the opposite direction of the display 108. This assembly provides for additional versatility insofar as attractiveness of displays is concerned. Certain objects may be suspended or placed on the platform 78 and certain other related advertising materials may be incorporated into the display 108. For example, the display 108 may comprise a replica of a beverage bottle which will rotate about a pole in one direction while information with respect thereto may be connected to the platform 78 and caused to rotate in the opposite direction. It will be obvious that one or more additional rotary platforms or displays may be provided above or below the described rotating means by providing additional gearing or friction wheels.

Figure 7:
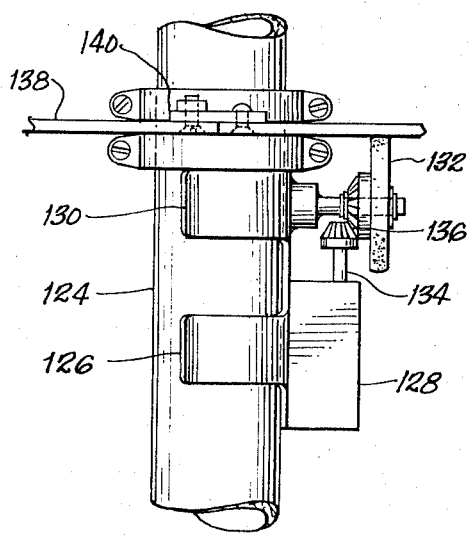
FIGURE 7 is a front elevation view of an additional alternative embodiment of this invention.
Figure 3:
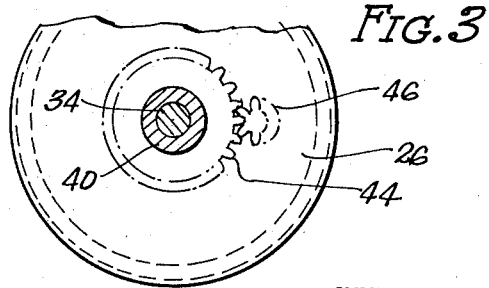
FIGURE 3 is a cross-sectional view taken about the line 3—3 of FIGURE 2.

FIGURE 7 illustrates a modification possible where it is not feasible to have poles divided in separate sections. Thus, the assembly shown is adapted to be fit about existing poles in stores or similar establishments. The assembly herein described comprises a pole 124 about which is fitted a clamp 126 having the same characteristics as a clamp 102 previously described. A motor 128 is shown connected to the clamp 126 and the drive shaft 134 of the motor extends upwardly therefrom.

A similar clamp 130 has fixed thereon a friction wheel 132 which is adapted to be rotated due to rotation of gear 136. A turntable 138 or the like is positioned for engagement with the wheel 132. The turntable is shown as composed of a pair of semicircular sections with means at 140 for clamping the sections together.

It will be apparent that the clamps 126 and 130 and the turntable 138 may be disposed on a pole of the type conventionally found in existing structures. The elements are so disposed whereby the gears 136 will mesh and whereby the wheel 132 and turntable 138 are in engagement. Therefore, operation of the motor 128 will result in rotation of the wheel 132 and ultimate rotation of the turntable 138. Displays of any of the above described types may be connected to or placed on the turntable 138. It will be obvious that the embodiment shown in FIGURE 7, that is, an embodiment where various of the mechanisms are clamped on the outside of an existing pole, may be employed where a motor directly drives a turntable or the like rather than driving a friction wheel. Furthermore, the clamping of the motor can be utilized to provide a set-up as shown in FIGURES 4 through 6 wherein two displays rotating in opposite directions are provided.

Where two pole sections are employed they are preferably at least partially hollow since the provision of the motor means inside the pole greatly simplifies transmission of the rotary motion and also provides a space saving feature. The poles are preferably of the conventional spring adjustable type having compressible ends similar to common pole lamps. However, it will be apparent that jack-type adjustments or similar mechanisms are feasible and it is, of course, contemplated that non-adjustable pole sections can be specifically manufactured for certain applications.

It will be understood that various modifications may be made in the above described apparatus which provide the characteristics of this invention without departing from the spirit thereof, particularly as defined in the following claims.

I claim:

1. An apparatus adapted for display purposes comprising a pair of axially aligned pole sections, means for holding said sections in spaced-apart relationship whereby an open space is defined therebetween, a display holding element, means connecting said holding element to at least one of said pole sections whereby said holding element is supported in said open space, means rotatably mounting said holding element in said open space and driving means for rotating said display holding element located in said open space.

2. An apparatus adapted for display purposes comprising a pair of fixed, axially aligned pole sections, at least one of said sections having an adjustable length, means for holding said sections in spaced-apart relationship whereby an open space is defined therebetween, a display holding element, means connecting said display holding element to at least one of said pole sections whereby said display holding element is supported in said open space, means rotatably mounting said display holding element in said open space, and driving means located in part within one of said sections at a point adjacent said open space for rotating said display holding element.

3. An apparatus according to claim 2 wherein said display holding element comprises a platform adapted to carry articles to be displayed.

4. An apparatus according to claim 2 wherein said display holding element is provided with a plurality of securing means for suspending the displays.

5. An apparatus adapted for display purposes comprising a pair of upper and lower axially aligned pole sections, at least one of said sections having an adjustable length, a first plate fitted in the bottom of the upper section and a second plate fitted in the top of said lower section, central bores in said plates, a shaft extending between said plates and into said bores, means securely holding said shaft with respect to said bores whereby said plates are held in spaced apart relation providing an exposed length of said shaft therebetween, a hub rotatably fitted about said shaft along the exposed length thereof, a display holding element formed on said hub, a driving gear formed on said hub, a pinion meshing with said driving gear and a motor adapted to rotate said pinion and drive said hub.

6. An apparatus according to claim 5 wherein said motor is provided within one of said pole sections, the drive shaft of said motor operating a means extending through one of said plates and said pinion being connected to said means extending through said plate.

7. An apparatus according to claim 5 wherein said display holding element comprises a platform adapted to carry articles to be displayed.

8. An apparatus according to claim 5 wherein said display holding element is provided with a plurality of securing means for suspending the displays.

9. An apparatus adapted for display purposes comprising a pair of upper and lower axially aligned pole sections, a first plate fitted in the bottom of the upper section and a second plate fitted in the top of said lower section, central bores in said plates, a shaft extending between said plates and into said bores, means securely holding said shaft with respect to said bores whereby said plates are held in spaced apart relation providing an exposed length of said shaft therebetween, a hub rotatably fitted about said shaft along the exposed length thereof, a display holding element formed on said hub, a driving gear formed on said hub, a pinion meshing with said driving gear and a motor adapted to rotate said pinion and drive said hub.

10. An apparatus according to claim 9 wherein said motor is provided within one of said pole sections, the drive shaft of said motor operating a means extending through one of said plates and said pinion being connected to said means extending through said plate.

11. An apparatus adapted for display purposes comprising a pair of axially aligned pole sections, means for holding said sections in spaced-apart relationship whereby an open space is defined therebetween, a display holding element, means connecting said holding element to said pole sections whereby said holding element is supported in said open space, means rotatably mounting said holding element in said open space, a rotatable sleeve loosely fitted about the pole section and located upwardly of said display holding element, and driving means for rotating said display holding element and said sleeve.

12. An apparatus according to claim 11 wherein said driving means comprises a motor operatively connected to said display holding element, a friction wheel positioned between said display holding element and said sleeve, said wheel engaging the upper surface of said display holding element and the lower edge of said sleeve whereby operation of said motor will cause said display holding element to drive said friction wheel which, in turn, will drive said sleeve.

13. An apparatus according to claim 1 wherein said pole sections are hollow, said apparatus including a mounting for said display holding element and means connected to said mounting comprising vertically extending arms adapted to fit into said pole sections and resiliently hold said sections in spaced apart relation.

14. An apparatus according to claim 11 wherein said pole sections are hollow, said apparatus including a mounting for said display holding element and means connected to said mounting comprising vertically extending arms adapted to fit into said pole sections and resiliently hold said sections in spaced apart relation.

15. An apparatus adapted for display purposes comprising a pole structure, a motor means clamped on the outside of said pole structure, display means comprising a ring adapted to rotate about the axis of said pole, and driving means connecting said motor means and said display means, said motor means being mounted closely adjacent said ring and said driving means including a friction wheel adapted to engage said ring to impart rotary movement thereto.

16. An apparatus in accordance with claim 15 wherein said ring comprises a disc-like member provided with means for securing display thereon.

17. An apparatus in accordance with claim 15 wherein said ring comprises a rotatable sleeve loosely fitted about said pole structure.

References Cited in the file of this patent

UNITED STATES PATENTS

| | | |
|---|---|---|
| 344,771 | Cushing | June 29, 1886 |
| 856,764 | Case | June 11, 1907 |
| 1,470,217 | Claus | Oct. 9, 1923 |
| 1,866,987 | Principessa | July 12, 1932 |
| 2,120,307 | Baker et al. | June 14, 1938 |
| 2,941,669 | Palay et al. | June 21, 1960 |
| 2,991,040 | Levy | July 4, 1961 |

FOREIGN PATENTS

| | | |
|---|---|---|
| 519,343 | Canada | Dec. 13, 1955 |
| 1,225,568 | France | Feb. 15, 1960 |